US009555764B2

(12) United States Patent
Hiruta et al.

(10) Patent No.: US 9,555,764 B2
(45) Date of Patent: Jan. 31, 2017

(54) AIRBAG AND AIRBAG APPARATUS

(71) Applicants: Honda Motor Co., Ltd., Tokyo (JP); Teruhiko Hiruta, Tokyo (JP); Mitsuo Maruoka, Tokyo (JP); Hiromichi Yoshikawa, Tokyo (JP)

(72) Inventors: Teruhiko Hiruta, Tokyo (JP); Mitsuo Maruoka, Tokyo (JP); Hiromichi Yoshikawa, Tokyo (JP); Makoto Nagai, Wako (JP); Yoshiyuki Tosa, Wako (JP)

(73) Assignees: TAKATA CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/966,876

(22) Filed: Dec. 11, 2015

(65) Prior Publication Data

US 2016/0167615 A1    Jun. 16, 2016

(30) Foreign Application Priority Data

Dec. 12, 2014  (JP) .................................. 2014-252394

(51) Int. Cl.
*B60R 21/239*  (2006.01)
*B60R 21/2342* (2011.01)
*B60R 21/2338* (2011.01)

(52) U.S. Cl.
CPC .......... *B60R 21/239* (2013.01); *B60R 21/2342* (2013.01); *B60R 2021/2395* (2013.01); *B60R 2021/23382* (2013.01)

(58) Field of Classification Search
CPC ..................... B60R 21/239; B60R 2021/2395; B60R 2021/23382
See application file for complete search history.

(56) References Cited

U.S. PATENT DOCUMENTS

| 6,382,662 B1 | 5/2002 | Igawa |
| 6,598,903 B2 | 7/2003 | Okada et al. |
| 7,040,655 B2 | 5/2006 | Igawa et al. |
| 7,111,866 B2 | 9/2006 | Abe et al. |
| 7,281,734 B2 | 10/2007 | Abe et al. |
| 7,445,239 B2 | 11/2008 | Okada et al. |

(Continued)

FOREIGN PATENT DOCUMENTS

| JP | H08-104196 A | 4/1996 | |
| JP | H10-157546 A | 6/1998 | |
| JP | 2001-080440 A | 3/2001 | |
| JP | 2002-053000 A | 2/2002 | |
| JP | 2002-362274 A | 12/2002 | |
| JP | 2004-148858 A | 5/2004 | |
| JP | 2004-256091 A | 9/2004 | |
| JP | 2006-103667 A | 4/2006 | |
| JP | 2007-302224 A | 11/2007 | |
| JP | WO 2007145027 A1 * | 12/2007 | ......... B60R 21/2342 |
| JP | WO 2008026384 A1 * | 3/2008 | ........... B60R 21/231 |
| JP | WO 2009019924 A1 * | 2/2009 | ......... B60R 21/2338 |
| JP | 4396492 B | 1/2010 | |
| JP | 2010-069974 A | 4/2010 | |
| JP | 2010-070016 A | 4/2010 | |
| JP | 2010-070017 A | 4/2010 | |
| JP | 2010-241214 A | 10/2010 | |
| JP | 2012-071747 A | 4/2012 | |
| JP | WO 2012060408 A1 * | 5/2012 | ........... B60R 21/203 |
| JP | 2012-166685 A | 9/2012 | |

*Primary Examiner* — Ruth Ilan
(74) *Attorney, Agent, or Firm* — Foley & Lardner LLP

(57) ABSTRACT

An airbag includes an airbag body formed by joining front and rear panels, an inlet of pressurized fluid, a vent hole communicating inside and outside of the airbag body, a regulation portion regulating discharge of the pressurized fluid from the vent hole and a coupling portion temporarily joining the front and rear panels. The inlet and the vent hole are formed on the rear panel. The regulation portion includes a connecting member, a vent hole cover and a link member. The connecting member regulates a thickness of the airbag body in the inflated state. The vent hole cover covers the vent hole and has one end portion supported by the rear panel and the other end portion joined to the coupling portion. The link member has one end portion joined to the vent hole cover and the other end portion joined to the connecting member.

3 Claims, 14 Drawing Sheets

(56) References Cited

U.S. PATENT DOCUMENTS

| | | |
|---|---|---|
| 7,497,467 B2 | 3/2009 | Chida et al. |
| 8,419,055 B2 | 4/2013 | Chida et al. |
| 2001/0000015 A1 | 3/2001 | Igawa et al. |
| 2001/0015545 A1 | 8/2001 | Igawa et al. |
| 2006/0113774 A1 | 6/2006 | Hirose et al. |
| 2008/0303257 A1* | 12/2008 | Nozaki ................ B60R 21/239 280/743.1 |
| 2009/0160164 A9 | 6/2009 | Abe |
| 2014/0151989 A1* | 6/2014 | Iwamoto ............... B60R 21/239 280/743.2 |
| 2015/0239421 A1* | 8/2015 | Hiruta .................. B60R 21/239 280/742 |
| 2015/0375711 A1* | 12/2015 | Umehara ............. B60R 21/239 280/740 |

* cited by examiner

AIRBAG AND AIRBAG APPARATUS

CROSS-REFERENCE TO RELATED APPLICATIONS

This application claims the benefit of Japanese Patent Application No. 2014-252394, filed on Dec. 12, 2014, the entire contents of which are hereby incorporated by reference, the same as if set forth at length, the entire of which are incorporated herein by reference.

TECHNICAL FIELD

The present invention relates to an airbag and an airbag apparatus for securing the safety of a passenger in the event of emergency, such as collision or rollover of a vehicle.

RELATED ART

Conventionally, there has been known an airbag apparatus in which an inflator is actuated in the event of emergency, such as collision or rollover of a vehicle, and the pressurized gas injected from the inflator allows an airbag body formed in a bag shape to be inflated and deployed from an accommodated state where the airbag body is folded, thereby protecting a passenger.

At this time, there are well known an airbag and an airbag apparatus having a configuration that a vent hole is formed in the airbag body, the pressurized gas is discharged from the interior of the airbag body through the vent hole when the passenger is crashed toward the airbag body inflated, and therefore, the airbag body softly receives a passenger.

For example, Patent Document 1 discloses an airbag in which one end portion of a strip-shaped vent hole cover covering a vent hole is joined to a base fabric constituting both surfaces of an airbag body, the other end portion of the vent hole cover is bifurcated and extended, the extended end portion thereof is joined to a passenger-side base fabric constituting the airbag body, and the vent hole cover located on the periphery of the vent hole is covered by a guide piece.

[Patent Document 1] JP-A-2012-166685

SUMMARY OF INVENTION

Technical Problem

In the above-described prior art, the vent hole cover is bifurcated and extended, and the extended end portion thereof is directly joined to the passenger-side base fabric. Therefore, due to the contact position when a passenger comes into contact with the passenger-side base fabric, variation occurs in the relaxed sate of the bifurcated portions. As a result, there occurs a problem that the opening degree of the vent hole is not stable.

It is preferable that such opening degree of the vent hole is stable, irrespective of the contact position of the passenger and the airbag body due to the collision direction or the physique of the passenger, or the like, and the direction of load applied to the airbag body from the passenger.

At this time, as one of the conditions to be considered, for example, in the case where a passenger seated in a state of being close to the airbag apparatus is restrained by the airbag body and the case where a passenger seated in a state of being apart from the airbag apparatus is restrained by the airbag body, it is more desirable to restrain the passenger by the airbag body in the state of being more preferably inflated, and furthermore, to stably discharge the pressurized gas in the interior of the airbag body from the vent hole.

The present invention aims to provide an airbag and an airbag apparatus which are capable of stabilizing the opening degree of a vent hole while improving an internal pressure maintaining performance and a deployment performance of an airbag body so that a restrained state corresponding to the physique and the seated position of a passenger is achieved when the airbag body is inflated from an accommodated state to restrain the passenger.

Solution to Problem

An airbag of the present invention includes an airbag body, an inlet of pressurized fluid, a vent hole, a regulation portion and a coupling portion. The airbag body is formed in a bag shape by joining a peripheral edge of a passenger-facing surface facing a passenger in an inflated state and a peripheral edge of a passenger-opposite surface opposite to the passenger-facing surface in the inflated state. The inlet of pressurized fluid is formed on the passenger-opposite surface. The vent hole is formed on the passenger-opposite surface and is configured to communicate inside and outside of the airbag body. The regulation portion is provided inside of the airbag body and is configured to regulate discharge of the pressurized fluid from the vent hole. The coupling portion is configured to temporarily join the passenger-facing surface and the passenger-opposite surface and is breakable. The regulation portion includes a connecting member, a vent hole cover and a link member. The connecting member is configured to regulate a thickness of the airbag body in the inflated state. The vent hole cover is configured to cover the vent hole and has one end portion which is supported by the passenger-opposite surface and the other end portion which is joined to the coupling portion. The link member has one end portion which is joined to the vent hole cover and the other end portion which is joined to the connecting member. The link member is supported by a support portion which is provided on the opposite side of a portion where the vent hole cover is supported by the passenger-opposite surface, with respect to the vent hole.

The airbag of the present invention includes an airbag body having a passenger-facing surface facing a passenger in an inflated state and a passenger-opposite surface opposite to the passenger-facing surface. The airbag body is formed in a bag shape by joining the peripheral edges of these surfaces to each other.

On the passenger-opposite surface constituting the airbag body, an inlet of the pressurized fluid is formed and a vent hole is formed at a position away from the inlet. The vent hole is configured so that the discharge of the pressurized fluid is regulated by a regulation portion provided in the interior of the airbag body.

On the other hand, the passenger-facing surface and the passenger-opposite surface are temporarily joined at the outside of the vent hole by a breakable coupling portion, separately from the joining of the peripheral edges thereof.

Further, the regulation portion includes a connecting member configured to regulate the thickness of the airbag body at the time of inflation, a vent hole cover configured to cover the vent hole and having one end portion supported on the passenger-opposite surface and the other end portion joined to the coupling portion, and a link member having one end portion joined to the vent hole cover and the other end portion joined to the connecting member.

The airbag is normally accommodated in a predetermined folded state in an airbag apparatus. When the pressurized fluid is introduced into the airbag body from the inlet by the collision of a vehicle, or the like, an internal pressure of the airbag body is maintained by the retention (joining) of a flap by the coupling portion and the tensioning of the connecting member while the airbag body is inflated and deployed from the folded state.

Further, in an initial inflated state, i.e., in a state before the coupling portion is broken, an internal volume of the airbag body is small, and therefore, the inflated state can be early achieved. In this way, it is possible to early restrain the passenger by the airbag body even when the passenger is seated at a position close to the airbag body.

On the other hand, also when the pressurized fluid is continuously introduced and the coupling portion is broken, the volume, i.e., the size of the airbag body can be increased while the inflated state of the airbag body is still maintained. In this way, it is possible to restrain the passenger by the airbag body even when the passenger is seated at a position away from the airbag body.

Further, when the coupling portion is broken by the load from the passenger in the case where the passenger is restrained before the coupling portion is broken and when the coupling portion is broken by the pressure of the pressurized fluid in the case where the pressurized fluid is continuously introduced, the other end portion of the vent hole cover becomes a free end at an initial stage of the breaking, i.e., by the breaking of the coupling portion to which the other end portion of the vent hole cover is joined.

In this way, the connecting member is relaxed by the load when the passenger is restrained, and simultaneously, the vent hole cover near an opening of a holding member is pushed to the outside of the vent hole to open the vent hole, so that the pressurized fluid can be discharged.

Thus, in the case where a passenger seated in a state of being close to the airbag apparatus is restrained and the case where a passenger seated in a state of being apart from the airbag apparatus is restrained, the passenger can be restrained in a more preferred inflated state. Further, in both cases, the pressurized fluid in the interior of the airbag body can be stably discharged from the vent hole.

Advantageous Effects of Invention

According to the present invention, a restrained state corresponding to the physique and the seated position of a passenger is achieved when the airbag body is inflated from the accommodated state to restrain the passenger. Therefore, it is possible to stabilize the opening degree of the vent hole while improving an internal pressure maintaining performance and a deployment performance of the airbag body.

BRIEF DESCRIPTION OF DRAWINGS

FIG. 4A is a bottom view of the diffuser and FIG. 4B is a front view of the diffuser.

DESCRIPTION OF EMBODIMENTS

Hereinafter, an illustrative embodiment of the present invention will be described with reference to the drawings.

In the present embodiment, an airbag 10 is used as an airbag apparatus 1 for a driver's seat of a vehicle.

Hereinafter, an illustrative embodiment of the present invention will be described with reference to the drawings.

Figure 1:
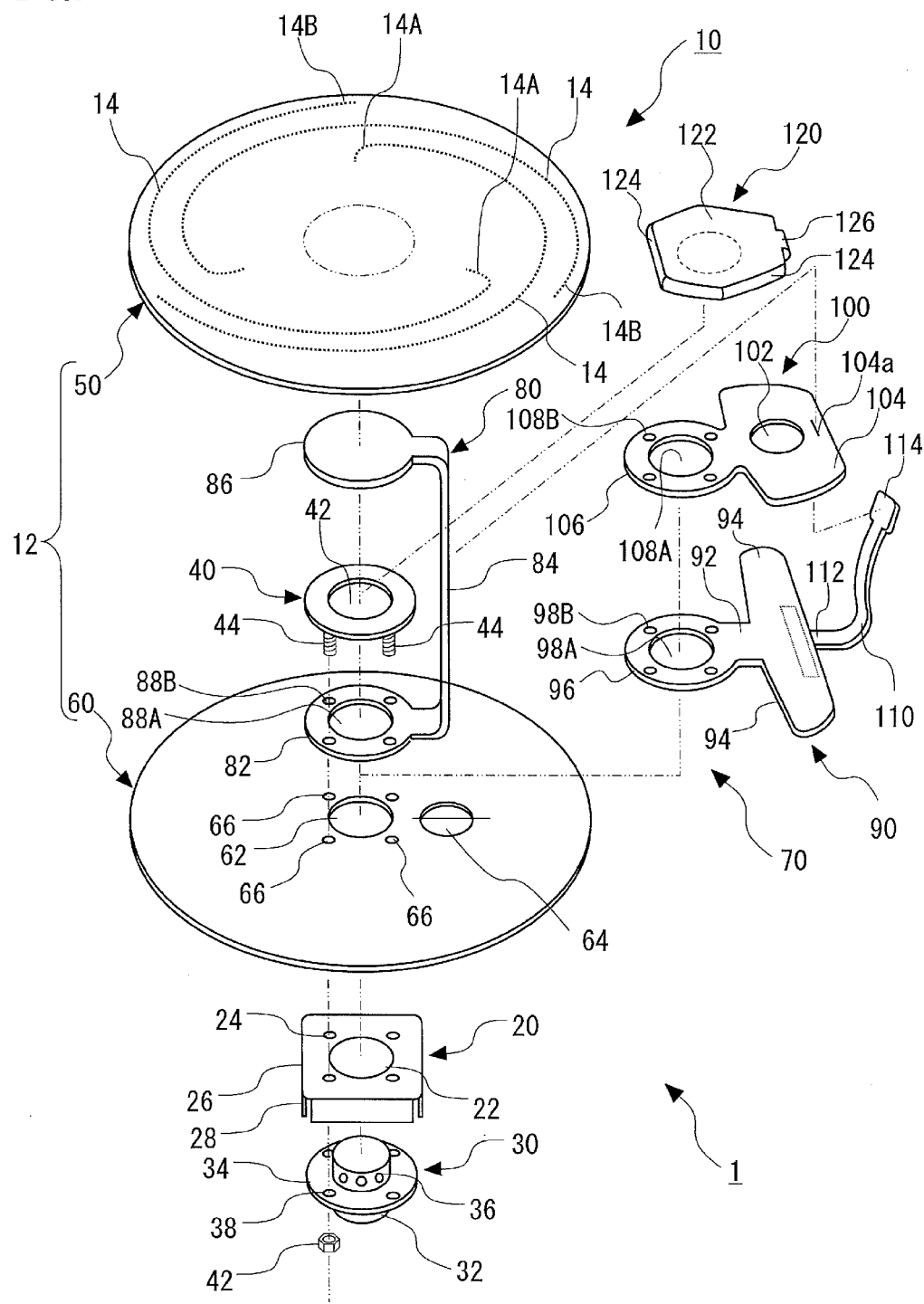
FIG. 1 is an exploded perspective view of an airbag apparatus according to the present embodiment.

The present embodiment is applied to the airbag apparatus 1 for a driver's seat of a vehicle. In FIG. 1, the airbag apparatus 1 includes an airbag 10, a retainer 20, an inflator 30, and a ring-shaped fixing member 40.

The airbag 10 includes a front panel 50 constituting a passenger-facing surface and a rear panel 60 constituting a passenger-opposite surface opposite to the passenger-facing surface. A peripheral edge of the front panel 50 facing a passenger in an inflated state (to be described later) and a peripheral edge of the rear panel 60 are joined to each other to form a bag-shaped airbag body 12.

On the rear panel 60 constituting the airbag body 12, an inlet 62 of the pressurized fluid is formed in the center thereof and a vent hole 64 is formed at a position away from the inlet 62.

Further, the airbag body 12 is configured so that, separately from the joining of the peripheral edges, the front panel 50 and the rear panel 60 are temporarily joined to each other at the outside of the vent hole 64 by tear seams 14 as three or more (e.g., three) breakable helical coupling portions. The tear seams 14 are provided so that the phases thereof are shifted in an arc shape so as to be overlapped in a radial direction with respect to the inlet 62. The overlap number is at least one less than the total numbers (e.g., the overlap number is two). Meanwhile, in FIG. 1, the tear seams 14 are shown only in the front panel 50.

Figure 2:
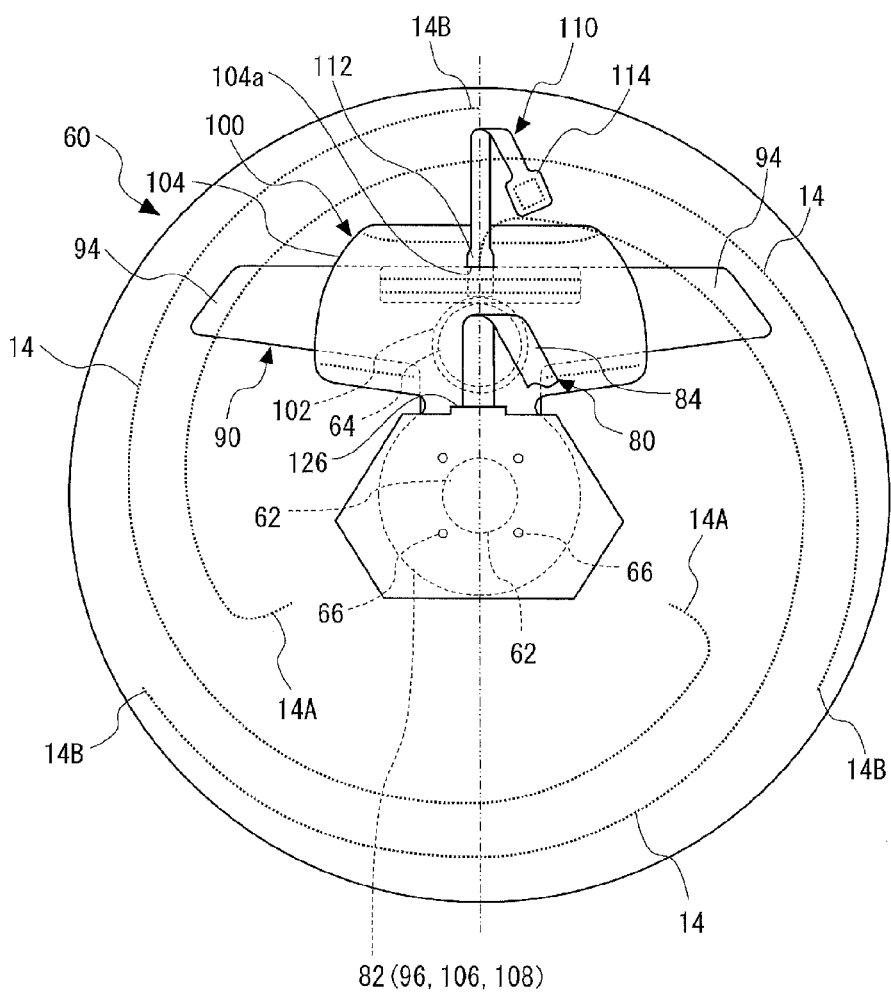
FIG. 2 is a front view of an airbag body of an airbag according to the present embodiment, as seen in a state where a front panel of the airbag is detached.

As shown in FIG. 2, three tear seams 14 have an arc shape in which each one end portion 14A flows in the inside of the airbag body 12 so that each other end 14B is located on the outside of the airbag body 12 than the one end portions 14A of the other tear seams 14.

More specifically, the front panel 50 and the rear panel 60 are sewn in a substantially helical trajectory by each of three tear seams 14. Here, the substantially helical trajectory is extended over an inner circumferential angle range of approximately 180° to 240° in the circumferential direction of the airbag body 12 and is gradually moved from the inside to the outside of the airbag 10 in a clockwise direction in FIG. 2.

Meanwhile, when, as in the present embodiment, each tear seam 14 is extended over an angle of 240° in the circumferential direction, three tear seams 14 are arranged so that the phases thereof are shifted from each other in an angle deviation of approximately 120° with respect to the center of the airbag body 12. In this way, it is possible to secure the arrangement in which the tear seams 14 are doubly overlapped in the radial direction at any angle from the center of the airbag body 12.

Further, the number of the tear seams 14, the length in the circumferential direction of each tear seam 14, and the shift (angle deviation) of the phases of the tear seams 14 are not limited to those described above. However, for example, when each of three tear seams 14 is extended over an angle of approximately 180° in the circumferential direction of the airbag body 12 and the angle deviation is set to 90°, the tear seams 14 can be doubly overlapped in the radial direction at any angle.

The tear seams 14 are configured to be broken when the pressure (internal pressure) inside the airbag body 12 is equal to or greater than a predetermined value, and thus, to release the coupling between the front panel 50 and the rear panel 60 and the coupling these panels and the ends of flaps 94. For example, the tear seams 14 can be formed by a sewing thread or the like to be cut when a predetermined tension is applied. Further, one end portion 14A of each tear seam 14 on the center side of the airbag body 12 is extended toward the center side of the airbag body 12, and a spacing distance between the one end portion 14A and the other tear seam 14 located in the vicinity thereof is adapted to be widen. Therefore, it is possible to allow the gas to be smoothly introduced into the outer peripheral side of the tear seams 14.

The retainer 20 is formed by pressing and punching a metal. The retainer 20 is integrally provided with a substantially square-shaped base portion 26 and a flange portion 28. The base portion 26 is formed with an opening 22 for an inflator (for introducing gas) and bolt insertion holes 24. The flange portion 28 is bent downward from four sides of the base portion 26. Further, the bolt insertion holes 24 are formed at four places around the opening 22.

The inflator 30 includes a substantially cylindrical inflator body 32, and a mounting flange portion 34 which is formed at an intermediate portion of the inflator body 32 and located at the bottom side of the base portion 26. Meanwhile, a known gas injection mechanism (not shown) is provided in the interior of the inflator body 32. Further, on the side peripheral surface of an axial leading end side of the mounting flange portion 34, the inflator body 32 is formed with a plurality of gas ejection ports 36. Furthermore, the mounting flange portion 34 is formed with bolt insertion holes 38.

The ring-shaped fixing member 40 is a metallic fixing ring for clamping the rear panel 60 together with the base portion 26. The ring-shaped fixing member 40 includes an opening 42 having a diameter larger than the inlet 62, and stud bolts 46 screwed to nuts 44. The ring-shaped fixing member 40 is adapted to fix the retainer 20 and the inflator 30 to a steering wheel 16 (shown in FIGS. 6 to 9).

The front panel 50 and the rear panel 60 are respectively made of a circular woven fabric of the same material. The front panel 50 and the rear panel 60 have substantially the same diameter. The peripheral edges of these panels are sewn by a peripheral seam (not shown), thereby forming the airbag body 12 in a bag shape.

The rear panel 60 includes the inlet 60 for introducing the pressurized fluid, which is formed on the central portion (the center), the vent hole 64, and bolt insertion holes 66 formed on the periphery of the inlet 62.

The vent hole 64 is formed at a position spaced apart by a predetermined distance to the center side from the peripheral edge of the rear panel 60 and also spaced apart from the inlet 62, thereby communicating the inside and outside of the airbag body 12. Further, the vent hole 64 is provided on a relatively inner peripheral side of the rear panel 60. Therefore, when the airbag apparatus 1 is installed as an airbag for a driver's seat of a vehicle, the vent hole 64 is positioned at the portion of the rear panel 60 on an inner peripheral side of the airbag body 12 than a wheel rim 18 (shown in FIGS. 6 to 9) of the steering wheel 16, in the arrangement at the time of the inflation and deployment.

Further, the airbag body 12 is provided at the interior thereof with a connecting member 80 for regulating the thickness of the airbag body 12 at the time of inflation, a vent hole cover 90 for covering the vent hole 64, a holding member 100 for covering the vent hole cover 90, a link member 110 having one end portion 112 joined to the vent hole cover 90 and the other end portion 114 joined to the connecting member 80, and a diffuser 120 mounted on the rear panel 60 so as to cover the inlet 62 and configured to radially eject the pressurized fluid introduced from the inlet 62. Meanwhile, the connecting member 80, the vent hole cover 90, the holding member 100 and the link member 110 constitute the regulation portion 70 in the claims.

The connecting member 80 includes an annular ring base fabric 82 located at the periphery of the inlet 62 of the rear panel 60, a strip-shaped suspending strap 84 having one end portion side integrally provided on the ring base fabric 82, and a circular suspending strap connection portion 86 integrally provided on the other end portion side of the suspending strap 84.

The annular ring base fabric 82 includes an inflator opening 88A formed on the central portion (the center), and bolt insertion holes 88B formed on the periphery of the inflator opening 88A. Further, the annular ring base fabric 82 can be fixed to the retainer 20 by screwing the nuts 44 to the stud bolts 46 in the state where, together with the rear panel 60, the vent hole cover 90, the holding member 100 and the diffuser 120, the front and back sides of the annular ring base fabric 82 are sandwiched between the base portion 26 and the ring-shaped fixing member 40.

In the present embodiment, the suspending strap connection portion 86 has a substantially complete round shape and is sewn to the vicinity of the substantially center of the inner wall surface of the front panel 50 by a seam.

Figure 3:
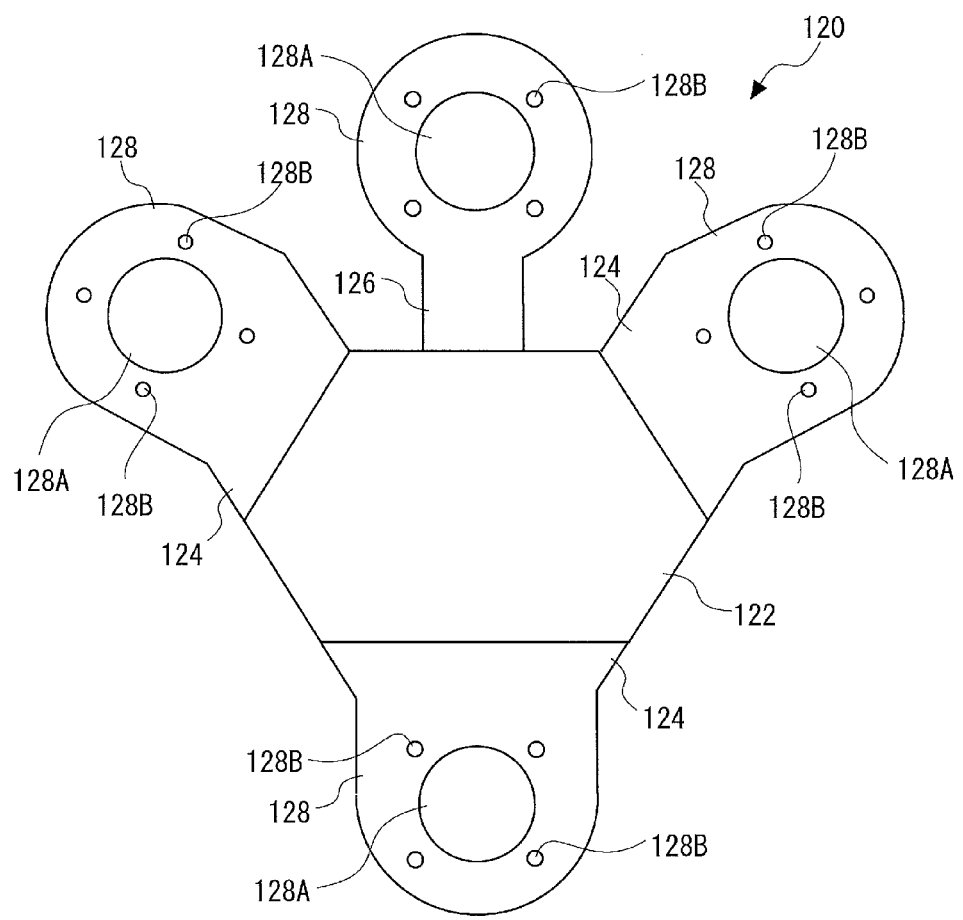
FIG. 3 is a development view of a diffuser which is applied to the airbag according to the present embodiment.

As shown in FIGS. 2 and 3, the vent hole cover 90 is extended along the radial direction of the rear panel 60 from the inlet 62 toward the vent hole 64. The vent hole cover 90 is integrally provided with a cover body 92 configured to close the vent hole 64 by traversing the vent hole 64 along the radial direction and a pair of flaps 94 extending in a direction perpendicular to the extension direction from the cover body 92.

The cover body 92 is integrally provided at its one end portion with an annular ring base fabric 96. The annular ring base fabric 96 includes an inflator opening 98A formed on the central portion (the center), and bolt insertion holes 98B formed on the periphery of the inflator opening 98A. Meanwhile, the one end portion of the cover body 92 constitutes one end portion of the vent hole cover 90 in the claims.

Therefore, at the central side in the radial direction of the rear panel 60, i.e., in the vicinity of the inlet 62, the vent hole cover 90 is supported on the rear panel 60 by screwing the nuts 44 to the stud bolts 46 in the state where the suspending strap connection portion 86 of the connecting member 80 and the ring base fabric 96 are overlapped and sandwiched between the base portion 26 and the ring-shaped fixing member 40.

At this time, in the present embodiment, the vent hole cover 90 is configured to be overlapped with the vent hole 64 from the inner side of the airbag body 12. Further, the same material and thickness as the rear panel 60 can be used as the material or the like of the vent hole cover 90. However, the material and the thickness of the vent hole cover 90 are not limited thereto so that the vent hole cover 90 can be more easily deformed than the rear panel 60. Further, it is preferable that the width of the cover body 92 is slightly wider than the diameter of the vent hole 64. This is intended to prevent a problem that, from the relationship between the above-described easy deformation and the internal pressure of the airbag body 12, a portion of the vent hole cover 90 is inadvertently exposed to the outside from the vent hole 64 when the airbag body 12 is inflated.

The ends of the flaps 94 are joined at positions closer to one end portions 14A than the other end portions 14B of two tear seams 14 different from each other. Meanwhile, the ends of the flaps 94 constitute the other end portion of the vent hole cover 90 in the claims.

The holding member 100 has a guide opening 102 at a position matching the vent hole 64 and a guide body 104 covering a predetermined range of vent hole cover 90 including the other end portion of the cover body 92 and the portion of the flaps 94 near the base portion. Further, the holding member 100 is configured so that an annular ring base fabric 106 is integrally provided at one end portion of the guide body 104. The annular ring base fabric 106 has an inflator opening 108A formed on the central portion (the center), and bolt insertion holes 108B formed on the periphery of the inflator opening 108A. Meanwhile, in the claims, the annular ring base fabric 106 constitutes one end portion of the holding member 100 and a free end of the guide body 104 constitutes the other end portion of the holding member 100.

Therefore, at the central side in the radial direction of the rear panel 60, i.e., in the vicinity of the inlet 62, the holding member 100 is supported on the rear panel 60 by screwing the nuts 44 to the stud bolts 46 in the state where the suspending strap connection portion 86 of the connecting member 80, the ring base fabric 96 and the ring base fabric 106 are overlapped and sandwiched between the base portion 26 and the ring-shaped fixing member 40.

Further, at a position near the other end portion of the cover body 92, the guide body 104 of the holding member 100 is formed with a slit-shaped pull-out hole 104a.

In the present embodiment, the link member 110 is configured so that one end portion 112 is joined to the other end portion edge of the vent hole cover 90 by sewing and the other end portion 114 is pulled out through the pull-out hole 104a formed in the guide body 104 located in the vicinity of the connection portion with the other end portion of the cover body 92, and then, is joined to the connecting member 80. Meanwhile, the link member 110 is configured so that the one end portion 112 is joined to the other end portion edge of the vent hole cover 90 by sewing, at a line segment P extending in the radial direction and passing through the center of the inlet 62 and the center of the vent hole 64. Further, the link member 110 may be configured integrally with or separately from the vent hole cover 90. Furthermore, the pull-out hole 104a constitutes a support portion in the claims. At this time, for example, the edge near the free end of the guide body 104 and the edge near the boundary between the guide body 104 and the ring base fabric 106 are joined to the rear panel 60 along the extension direction of the flaps 94 by sewing. Therefore, the central portion of the sewing in the edge near the free end of the guide body 104 may be unoccupied and the other end portion 114 of the link member 110 may be pulled out through the non-sewing portion unoccupied. In this case, the non-sewing portion of the guide body 104 corresponds to the support portion in the claims. Furthermore, the holding member 100 is configured so that the ring base fabric 106 as one end portion is supported on the rear panel 60, a portion of the flaps 94 are covered so as to be guided by the guide body 104 as the other end portion, and the other end portion of the link member 110 is pulled out to the guide body 104 joined to the rear panel 60 by sewing. In this way, the holding member 100 for stably holding the vent hole cover 90 can be intensively configured so as to have a function as the support portion. Further, since the pull-out hole 104a is provided in the holding member 100 for stably holding the vent hole 64, it is possible to more stably adjust the opening degree of the vent hole 64.

The diffuser 120 includes a polygonal body portion 122 facing the inlet 62, and a plurality of folded-back pieces 124 provided at a plurality of sides of the body portion 122. The pressurized fluid can be radially ejected from the remaining sides of the body portion 122 where the folded-back piece 124 is not present.

In the present embodiment, as shown in FIG. 3, the diffuser 120 is configured so that the folded-back pieces 124 are formed at three sides out of six sides of the hexagonal body portion 122, which are not adjacent to each other, and a second folded-back piece 126 is integrally provided at a portion of any one side where the folded-back pieces 124 are not formed.

At this time, a side matching the inside of the connecting member 80 is set as any one side for the second folded-back piece 126.

Further, the folded-back pieces 124 at three sides and the second folded-back piece 126 are integrally provided at their ends with an annular ring base fabric 128. Each annular ring base fabric 128 has an inflator opening 128A formed on the central portion (the center), and bolt insertion holes 128B formed on the periphery of the inflator opening 128A.

Figure 4A:
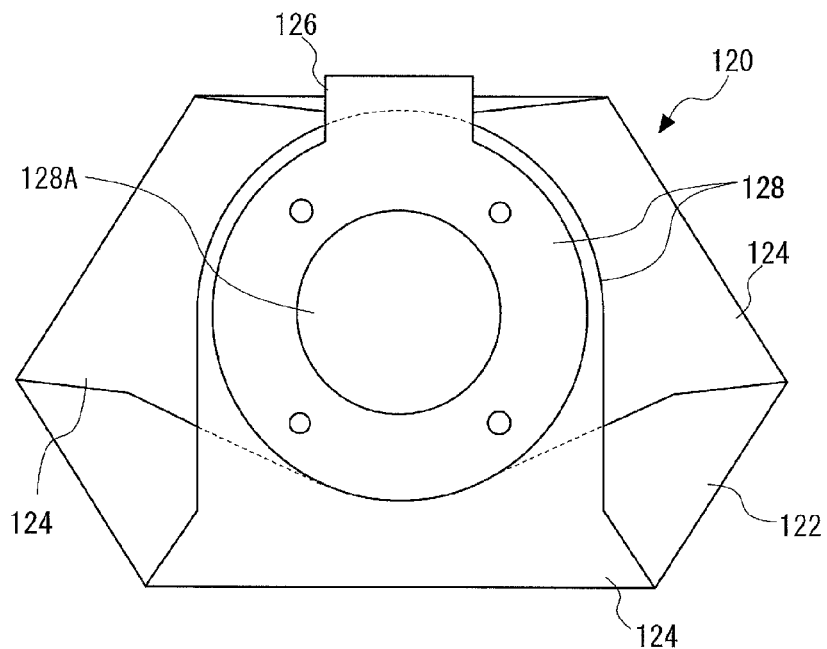
FIGS. 4A and 4B show the diffuser which is applied to the airbag according to the present embodiment.
Figure 4B:
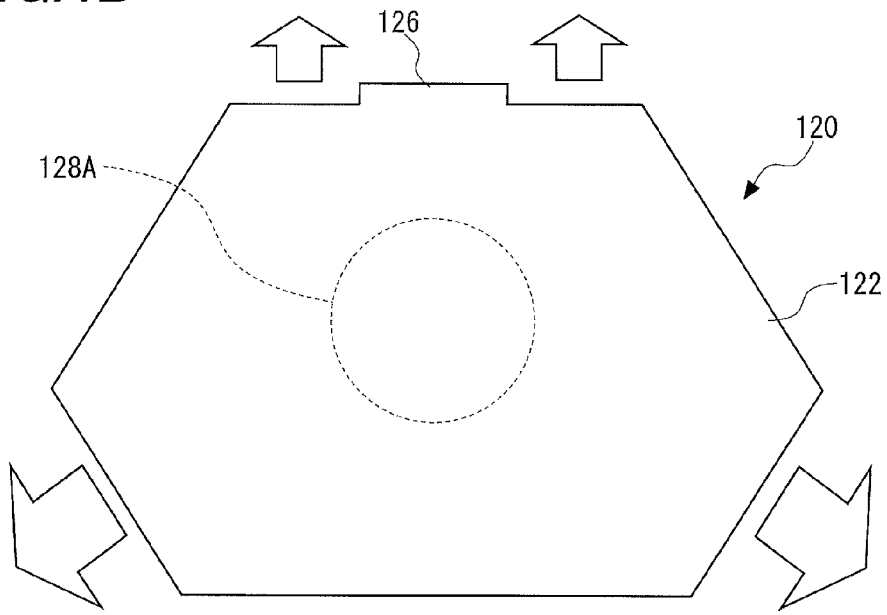

Therefore, as shown in FIG. 4A, three folded-back pieces 124 and the second folded-back piece 126 are overlapped, and hence, the inflator opening 128A and the bolt insertion holes 128B are caused to match, so that the diffuser 120 can have a substantially hexagonal three-dimensional shape, as seen in a plan view, as shown in FIG. 4B.

Further, at the central side in the radial direction of the rear panel 60, i.e., in the vicinity of the inlet 62, the diffuser 120 is supported on the rear panel 60 by screwing the nuts 44 to the stud bolts 46 in the state where the suspending strap connection portion 86 of the connecting member 80, the ring base fabric 96, the ring base fabric 106 and each ring base fabric 128 are overlapped and sandwiched between the base portion 26 and the ring-shaped fixing member 40 in such a way to cover the ring-shaped fixing member 40 by the diffuser 120.

The diffuser 120 is configured so that the ejection amount of the pressurized fluid ejected toward a lower side of a vehicle is greater than that of the pressurized fluid ejected toward an upper side of the vehicle in the state where the airbag body 12 is installed to the steering wheel 16. Namely, in the diffuser 120, the number of remaining sides where the folded-back piece 124 for radially ejecting the pressurized fluid is not present matches the number of the tear seams 14.

Further, the one end portions 14A of the tear seams 14 and the remaining sides where the folded-back piece 124 is not present are assembled so as to match in the radial direction of the airbag body 12.

Figure 5:
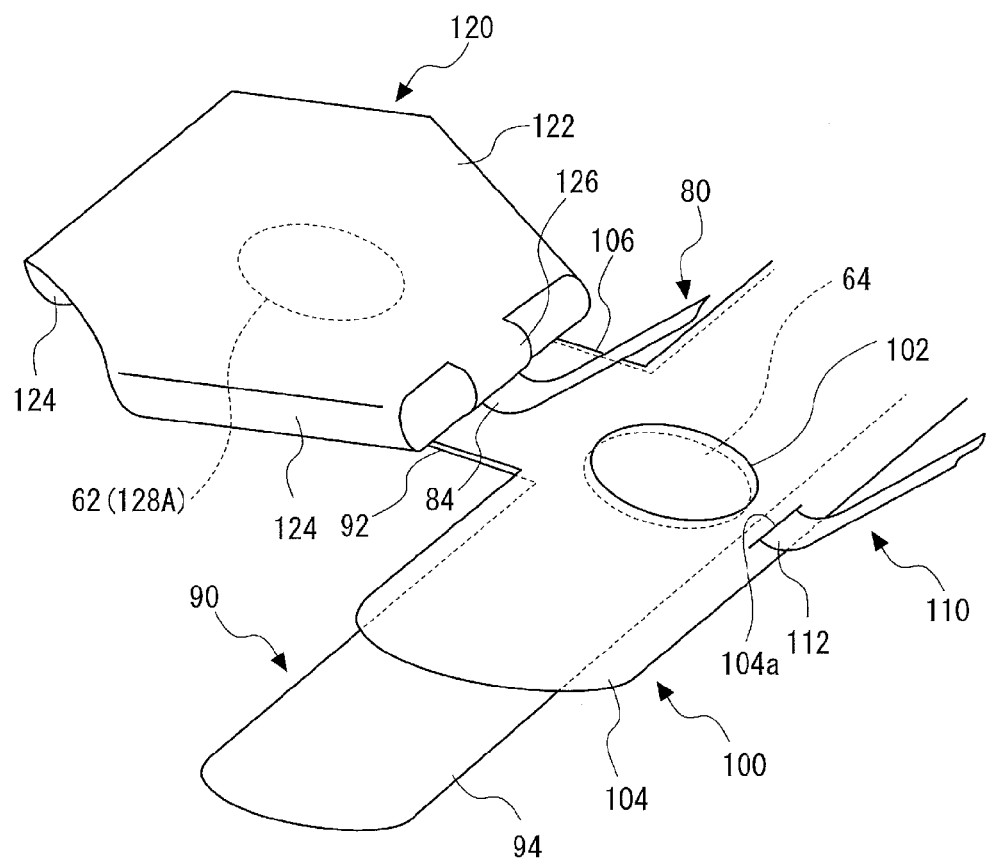
FIG. 5 is a perspective view showing a portion of a regulation portion which is applied to the airbag according to the present embodiment.

Furthermore, as shown in FIG. 5, the second folded-back piece 126 is located on the line segment P extending in the radial direction and passing through the center of the inlet 62 and the center of the vent hole 64, and the suspending strap 84 of the connecting member 80 is located on the outside thereof.

In the above configuration, in order to mount the airbag 10, first, three folded-back pieces 124 and the second folded-back piece 126 are overlapped while accommodating the diffuser 126 so as to wrap around the ring-shaped fixing member 40 from the deployment shape, the inflator opening 128A and the bolt insertion holes 128B are caused to match, and the stud bolts 46 are inserted through the bolt insertion holes 128B. Further, the one end portion 112 of the link member 110 is joined to the vent hole cover 90.

Subsequently, the vent hole cover 90, the holding member 100, the connecting member 80 and the diffuser 120 are overlapped in this order with respect to the rear panel 60, and the ring base fabric 96, the ring base fabric 106, the ring base fabric 82 and the ring base fabric 128 are caused to match. Then, the nuts 44 are screwed to the stud bolts 56 of the ring-shaped fixing member 40, thereby achieving a temporary assembled state.

Furthermore, the suspending strap connection portion 86 of the connecting member 80 is joined to the front panel 50, and the other end portion 114 of the link member 110 is joined to the suspending strap 84.

Then, the front panel 50 and the rear panel 60 are overlapped in an enlarged state where the suspending strap connection portion 86 and the link member 110 are displaced to the center of the rear panel 60 so as not to be caught by the tear seams 14 and each leading end of the flaps 94 is caught by the tear seams 14. Then, the peripheries of these panels are jointed to each other by sewing or the like and the tear seams 14 are formed. In this way, the airbag 10 is in an assembled state. Meanwhile, at this time, the retainer 20 and the inflator 30 may be assembled to the airbag 10.

This airbag apparatus is operated as follows.

For example, when an operation signal is inputted from a control device of a passenger restraint system (not shown) to the inflator 30, the inflator 30 is operated to eject the pressurized gas into the interior of the airbag body 12 in a predetermined direction via the diffuser 120 from the inlet 62.

The airbag body 12 is inflated by the pressurized gas to push and open a module cover. Then, the airbag body 12 is deployed while being inflated in a vehicle interior, thereby restraining a passenger seated on a driver's seat.

Figure 6:
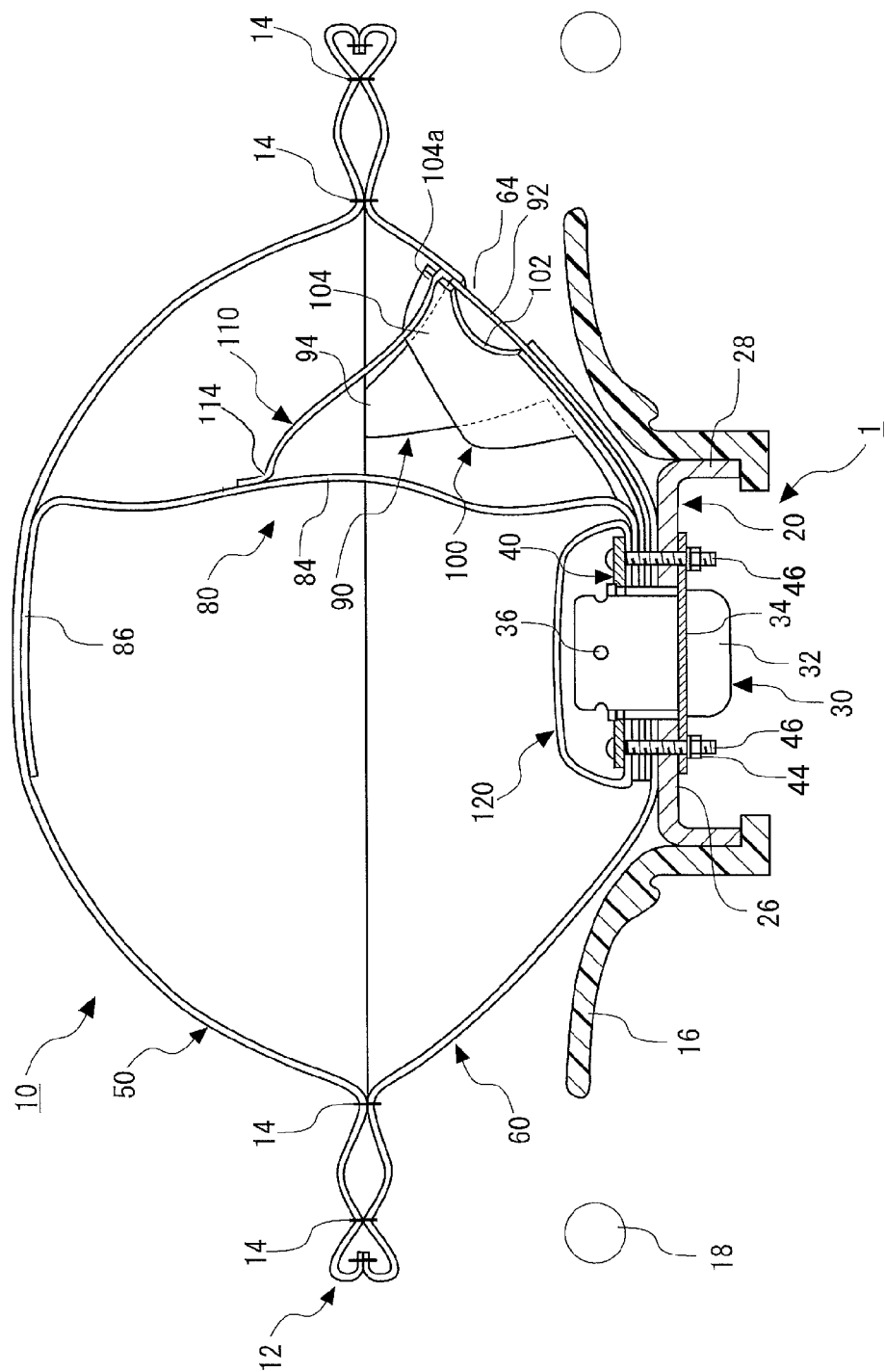
FIG. 6 is a sectional view of the airbag apparatus according to the present embodiment in an initial stage of the airbag deployment.

In this case, until the internal pressure of the airbag body 12 is equal to or greater than a predetermined value, the coupled state of the front panel 50 and the rear panel 60, and the ends of the flaps 94 of the vent hole cover 90 by the tear seams 14 is not released, as shown in FIG. 6. Therefore, the inflation of the portion of the airbag body 12 on the outer peripheral side of the tear seams 14 is regulated.

Further, the cover body 92 of the vent hole cover 90 is prevented from moving to the outside of the airbag body 12 by the flaps 94 and is in a state of being overlapped with the vent hole 64. In this way, the vent hole 64 is closed to prevent the pressurized gas from being discharged to the outside of the airbag body 12 from the vent hole 64. Therefore, the internal pressure of the airbag body 12 is quickly increased even without using a high-output inflator 30.

The stress caused by the internal pressure of the airbag body 12 is concentrated on the one end portion 14A of the inside (center side) of each tear seam 14. Further, the breaking of the tear seams 14 is started from the one end portions 14A toward the other end portions 14B when the internal pressure of the airbag body 12 is equal to or greater than a predetermined value.

Figure 7:
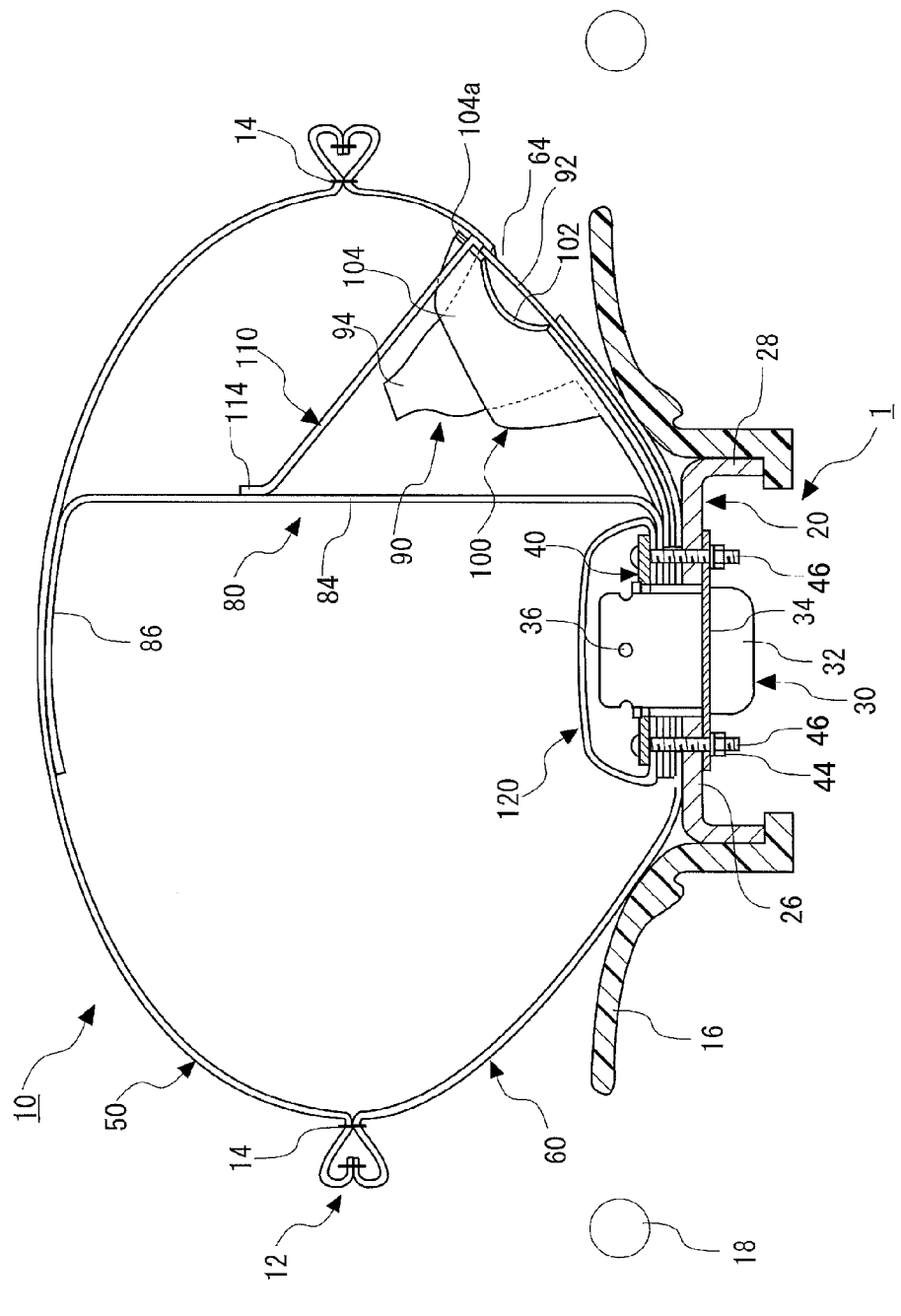
FIG. 7 is a sectional view of the airbag apparatus according to the present embodiment in an initial stage of the tear seam breaking, which corresponds to a medium stage of the airbag deployment.

First, as shown in FIG. 7, the breaking of the tear seams 14 allows the joining with the ends of the flaps 94 to be released, so that the ends of the flaps 94 become a free end to the airbag body 12.

Figure 8:
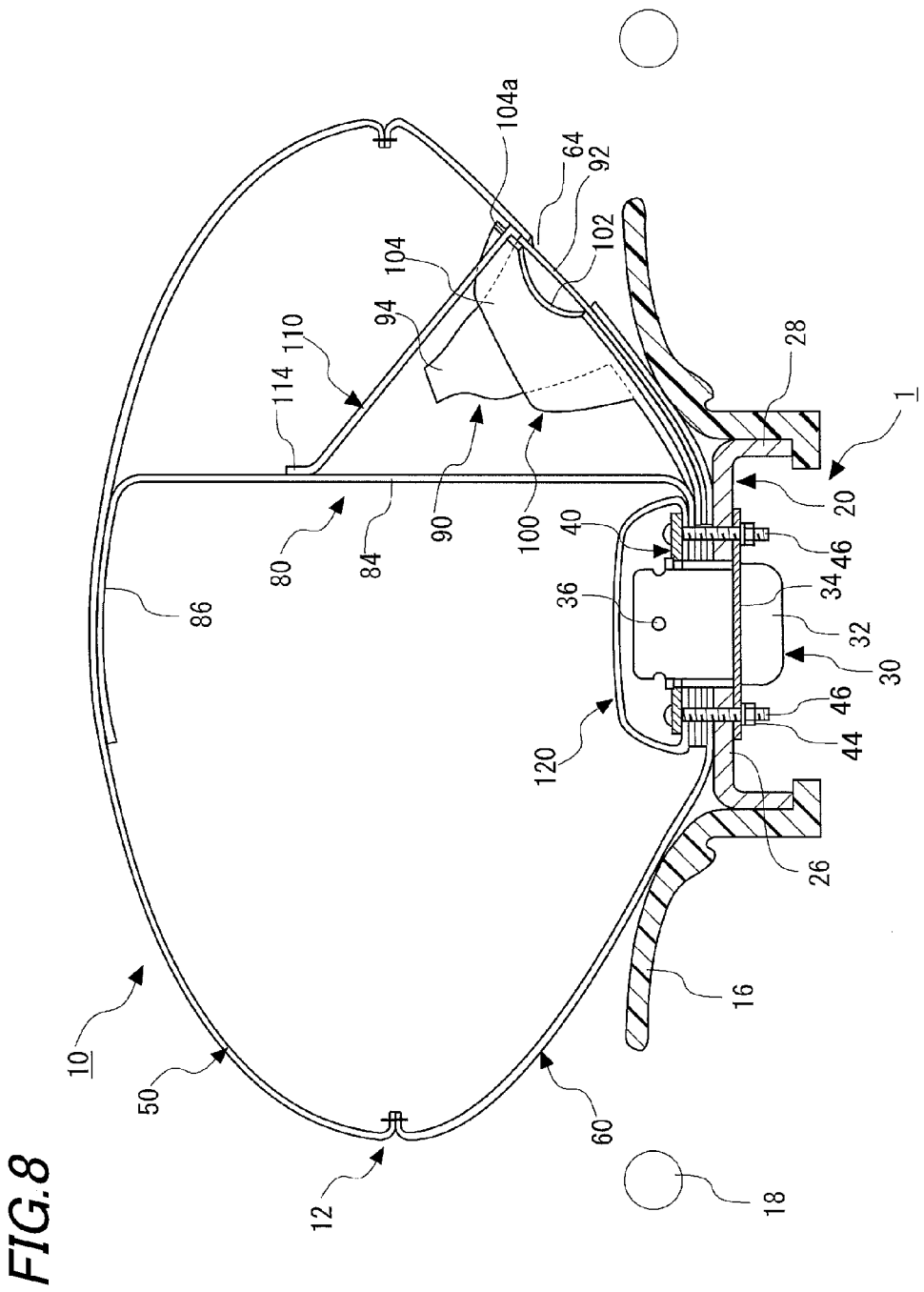
FIG. 8 is a sectional view of the airbag apparatus according to the present embodiment in a completed stage of the tear seam breaking, which corresponds to a later stage of the airbag deployment.

Further, as shown in FIG. 8, the airbag body 12 is inflated to the outermost peripheral portion when the regions of the front panel 50 and the rear panel 60 up to the outermost peripheral portions of the airbag body 12 can be separated by the breaking of the tear seams 14.

Then, until a passenger comes into contact with the airbag body 12, the cover body 92 of the vent hole cover 90 is prevented from moving to the outside of the airbag body 12 by the tension of the connecting member 80 and the link member 110 and is overlapped with the vent hole 64. In this way, the vent hole 64 is still in a state of being closed.

Therefore, also in this stage, the pressurized gas is prevented from being discharged from the vent hole 64, so that the internal pressure of the airbag body 12 is maintained at a predetermined value.

Figure 9:
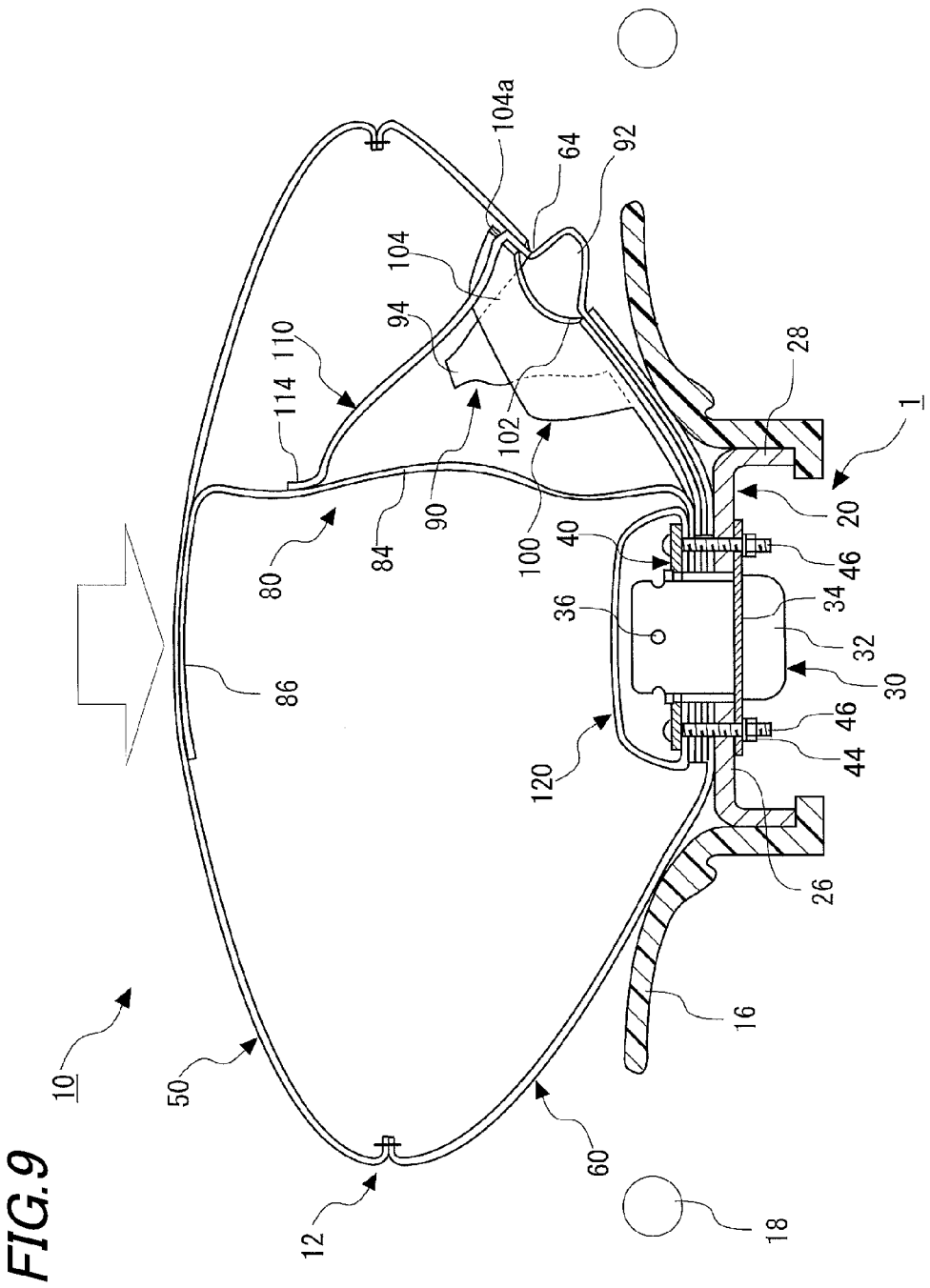
FIG. 9 is a sectional view of the airbag apparatus according to the present embodiment at the time of the passenger restraint after the airbag deployment.

Further, when a passenger comes into contact with the airbag body 12, the front panel 50 is pushed by the passenger and is retracted toward the rear panel 60, and hence, the connecting member 80 and the link member 110 are relaxed, as shown in FIG. 9. In this way, the vent hole cover 90 can be moved to the outside of the airbag body 12 from the vent hole 64 by the relaxed amount and the amount corresponding to the load from the passenger.

In this way, the vent hole cover 90 is pushed to the outside of the airbag body 12 from the vent hole 64 by the internal gas pressure of the airbag body 12, so that the vent hole 64 is opened. As a result, the gas is discharged to the outside of the airbag body 12 from the vent hole 64, and thus, the passenger can be softly received by the airbag body 12.

Figure 10:
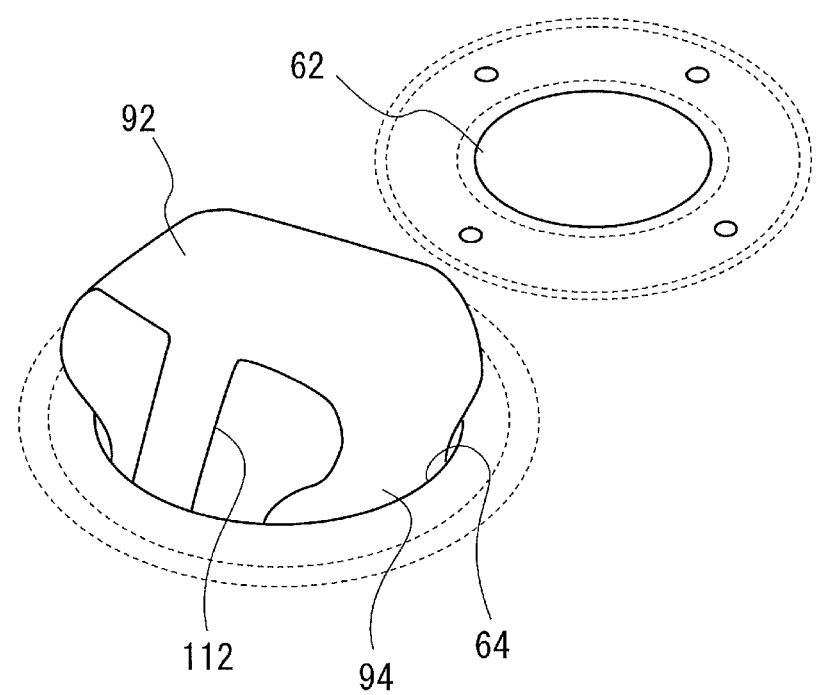
FIG. 10 is a perspective view of a main part of the airbag according to the present embodiment in an opening state of a vent hole.

At this time, as shown in FIG. 10, in addition to a portion of the other end portion side of the cover body 92, a portion of the base portion side of the flaps 94 and a portion of the one end portion 112 of the link member 110 are pushed to the outside of the airbag body 12 from the vent hole 64 so as to protrude therefrom.

Thus, the internal pressurized gas of the airbag body 12 is discharged through a space portion on the outside of the link member 110.

By the way, although not shown, the tear seams 14 are broken by the load from a passenger when the passenger seated close to the vehicle front comes into contact with the airbag body 12 before the internal pressure of the airbag body 12 is equal to or greater than a predetermined value, for example, before the tear seams 14 shown in FIG. 6 are broken. Thus, the opening of the vent hole 64 and the capacity of the airbag body 12 are increased, so that it is possible to softly receive the passenger.

At this time, when the load from the passenger is large, the vent hole 64 is opened by the cover body 92 at the timing when the joining of both edge ends of the flaps 94 and the tear seams 14 is released in parallel with the breaking of the tear seams 14. As a result, the internal pressure can be adjusted, so that it is possible to softly restrain the passenger.

Meanwhile, such timing is similar even in the state where the tear seams 14 shown in FIG. 7 start to break and the joining of each leading end of the flaps 94 and the tear seams 14 is released.

Further, before the tear seams 14 shown in FIG. 6 or FIG. 7 are broken or immediately after the start of the breaking of the tear seams, the airbag body 12 is applied in a direction in which the volume is increased or the pressurized gas is lost when the load from the passenger applied to the airbag body 12 is small, i.e., even in the state where the passenger comes into contact with the airbag body 12 and the coupled state of the front panel 50 and the rear panel 60 by the tear seams 14 is maintained to be facilitated only by the load. Therefore, the passenger can be restrained without undergoing excessive reaction from the airbag body 12 in accordance with the introduction of the pressurized gas.

Thereafter, when the internal pressure of the airbag body 12 reaches a predetermined value or more, the tear seams 14 are broken, the coupling between the front panel 50 and the rear panel 60, and each leading end of the flaps 94 is released, and the fixing of the cover body 92 by the flaps 94 is also released. At this time, since the front panel 50 is already in the state of being pushed and retracted by the passenger, the link member 110 is in the state of being not tensioned but relaxed. Therefore, the cover body 92 is immediately pushed to the outside of the airbag body 12 from the vent hole 64 by the internal gas pressure of the airbag body 12, so that the vent hole 64 can be opened. In this way, the pressurized gas is discharged to the outside of the airbag body 12 from the vent hole 64, and therefore, the passenger can be softly received by the airbag body 12.

As a result, in the airbag 10 and the airbag apparatus 1 of the present embodiment, the vent hole is in a state of being closed or in a state of being slightly opened until the internal pressure of the airbag is equal to or greater than a predetermined value, and the vent hole is opened when the internal pressure of the airbag is equal to or greater than the predetermined value and the passenger comes into contact with the airbag.

In this way, the airbag 10 according to the present embodiment is normally accommodated in the airbag apparatus 1 in a predetermined folded state. When the pressurized gas is introduced from the inlet 62 due to the collision or the like of a vehicle, the internal pressure of the airbag 10 is maintained by the joining of the flaps 94 by the tear seams 14 and the tension of the connecting member 80 while the airbag body 12 is inflated and deployed from the folded state.

At this time, since the link member 110 is pulled out through the pull-out hole 104*a* formed in the guide body 104 of the holding member 100 and located near the connecting portion with the other end portion of the cover body 92, the guide body 104 is not rolled upward even in a case of being tensioned by the inflation of the airbag body 12.

Further, in an initial inflated state, i.e., in a state before the tear seams 14 are broken, an internal volume of the airbag body 12 is small, and therefore, the inflated state can be early achieved. In this way, it is possible to restrain the passenger by the airbag body 12 even when the passenger is seated at a position close to the airbag body 12.

On the other hand, after the pressurized gas is continuously introduced and the tear seams 14 are broken, the volume of the airbag body 12 is increased while the inflated state of the airbag body 12 is maintained, and the flaps 94 close the vent hole 64 by the tension of the connecting member 80 and the link member 110, so that the internal pressure of the airbag body 12 is maintained. In this way, it is possible to restrain the passenger by the airbag body 12 even when the passenger is seated at a position away from the airbag body 12.

Further, when the tear seams 14 are broken by the pressure of the gas introduced as the load from the passenger in the case where the passenger is restrained before the tear seams 14 are broken, the ends of the flaps 94 become a free end at an initial stage of the breaking, i.e., by the breaking of the tear seams 14, to which the ends of the flaps 94 are joined and which are located at an inner side.

In this way, the connecting member 80 is relaxed by the load when the passenger is restrained, and simultaneously, the cover body 92 near the guide opening 102 formed in the guide body 104 is pushed to the outside of the vent hole 64 to open the vent hole 64, so that the pressurized gas can be discharged.

At this time, since the other end portion 114 of the link member 110 is joined to the connecting member 80, the link member 110 can be relaxed simultaneously with the relaxation of the connecting member 80. Therefore, it is possible to stabilize the opening degree of the vent hole 64, irrespective of the contact position of the passenger and the airbag body 12 due to the collision direction or the physique of the passenger, or the like, and the direction of load applied to the airbag body 12 from the passenger.

Thus, in the case where a passenger seated in a state of being close to the airbag apparatus 1 is restrained and the case where a passenger seated in a state of being apart from the airbag apparatus 1 is restrained, the passenger can be restrained in a more preferred inflated state. Furthermore, in both cases, the pressurized gas in the interior of the airbag body 12 can be stably discharged from the vent hole 64.

Further, three or more tear seams 14 in the present embodiment have an arc shape in which each one end portion 14A flows in the inside of the airbag body 12 so that each other end 14B is located on the outside of the airbag body 12 than the one end portions 14A of the other tear seams 14. The flaps 94 are joined at positions closer to one end portions 14A than the other end portions 14B of two tear seams 14 different from each other.

In this way, one end portion 14A of the tear seam 14 located on the inside of the airbag body 12 is able to start breaking earlier than the other end portion 14B, so that the ends of the flaps 94 as a free end allow the vent hole 64 to be early opened.

Further, the airbag 10 includes the diffuser 120 which is assembled to the rear panel 60 so as to cover the inlet 62 and radially ejects the pressurized gas introduced from the inlet 62. Therefore, it is possible to regulate the ejection direction of the pressurized gas by the diffuser 120.

At this time, the diffuser 120 includes the polygonal body portion 122 facing the inlet 62, and a plurality of foldedback pieces 124 provided at a plurality of sides of the body portion 122, and the pressurized fluid can be radially ejected from the remaining sides of the body portion 122 where the folded-back piece 124 is not present. Therefore, it is possible to regulate the ejection direction and ejection amount of the pressurized gas.

Furthermore, the diffuser 120 includes the second folded-back portion 126 provided at a portion of any one side out of a plurality of sides of the body portion 122, and the second folded-back piece 126 matches in the inside of the connecting member 80. Therefore, the connecting member 80 can be protected from the pressurized gas ejected from the diffuser 120 and it can be suppressed that the discharge regulation of the pressurized gas from the airbag body 12 by the connecting member 80 is hindered.

Furthermore, the diffuser 120 is configured so that the ejection amount of the pressurized gas ejected toward a lower side of a vehicle is greater than that of the pressurized gas ejected toward an upper side of the vehicle in the state where the airbag body 12 is installed.

Specifically, the ejection amount and ejection direction of the pressurized gas by the diffuser 120 can be regulated by the length of each side forming the shape of the body portion 122 and the presence or absence of a plurality of folded-back pieces 124. In this way, the length of each side located at the lower side of the vehicle and the presence or absence of the folded-back pieces 124, and the length of each side located at the upper side of the vehicle and the presence or absence of the folded-back pieces 124 can be adjusted. As a result, the ejection amount of the pressurized gas ejected toward the lower side of the vehicle can be greater than that of the pressurized gas ejected toward the upper side of the vehicle in the state where the airbag body 12 is installed.

In this way, at the time of inflation of the airbag body 12, the ejection amount of the pressurized gas to the portion located at the lower side of the vehicle, which restrains the vicinity of the chest of the passenger, can be greater than that of the pressurized gas to the portion located at the upper side of the vehicle, which restrains the vicinity of the head of the passenger.

At this time, in the diffuser 120, the number of remaining sides where the folded-back piece 124 for radially ejecting the pressurized gas is not present matches the number of three or more tear seams 14, and the remaining sides where the folded-back piece 124 is not present match the one end portions 14A of the tear seams 14 in the radial direction of the airbag body 12.

In this way, it is possible to easily set the breaking timing of one end portions 14A of the tear seams 14 located at the inside of the airbag body 12.

Meanwhile, some of the ejection directions of the pressurized gas by the diffuser 120 are caused to match the radial line segments P passing through the center of the inlet 62 and the center of the vent hole 64, and the one end portion 14A of the tear seam 14 on the innermost edge and the other end portion 14B of the tear seam 14 on the outermost edge are caused to match the radial line segments P passing through the center of the inlet 62 and the center of the vent hole 64. Therefore, it is possible to more easily and early set the opening timing of the vent hole 64 by the ends of the flaps 94 as a free end.

In this way, a combination of the spiral shape of the tear seams 14 and the control for the opening timing of the vent hole 64 by the ends of the flaps 94 as a free end enables improvements in performance of maintaining the internal pressure of the airbag body 12. Further, the breaking timing of the tear seams 14 is set according to the early opening timing (e.g., the coupling position between the tear seams 14 and the ends of the flaps 94 is set to the first lap not the second lap from the inner periphery), so that it is possible to enable the early discharge at the time of so-called passenger proximity deployment.

On the other hand, a further combination of the diffuser 120 to the spiral shape of the tear seams 14 and the control for the release timing of the flaps 94 enables the pressurized gas to be easily rectified. Therefore, it is possible to easily enable the early discharge at the time of so-called passenger proximity deployment.

At this time, the direct ejection of the pressurized gas to the connecting member 80 is avoided, and hence, the disturbance of the pressurized gas can be suppressed. As a result, it is possible to improve the robustness including the tolerance of the connecting member 80.

Furthermore, it is possible to easily secure the compatibility of the low aggression for a small-sized passenger and a passenger restraint for a large-sized passenger even when a single inflator is used as an inflator for ejecting the pressurized gas.

Figure 11:
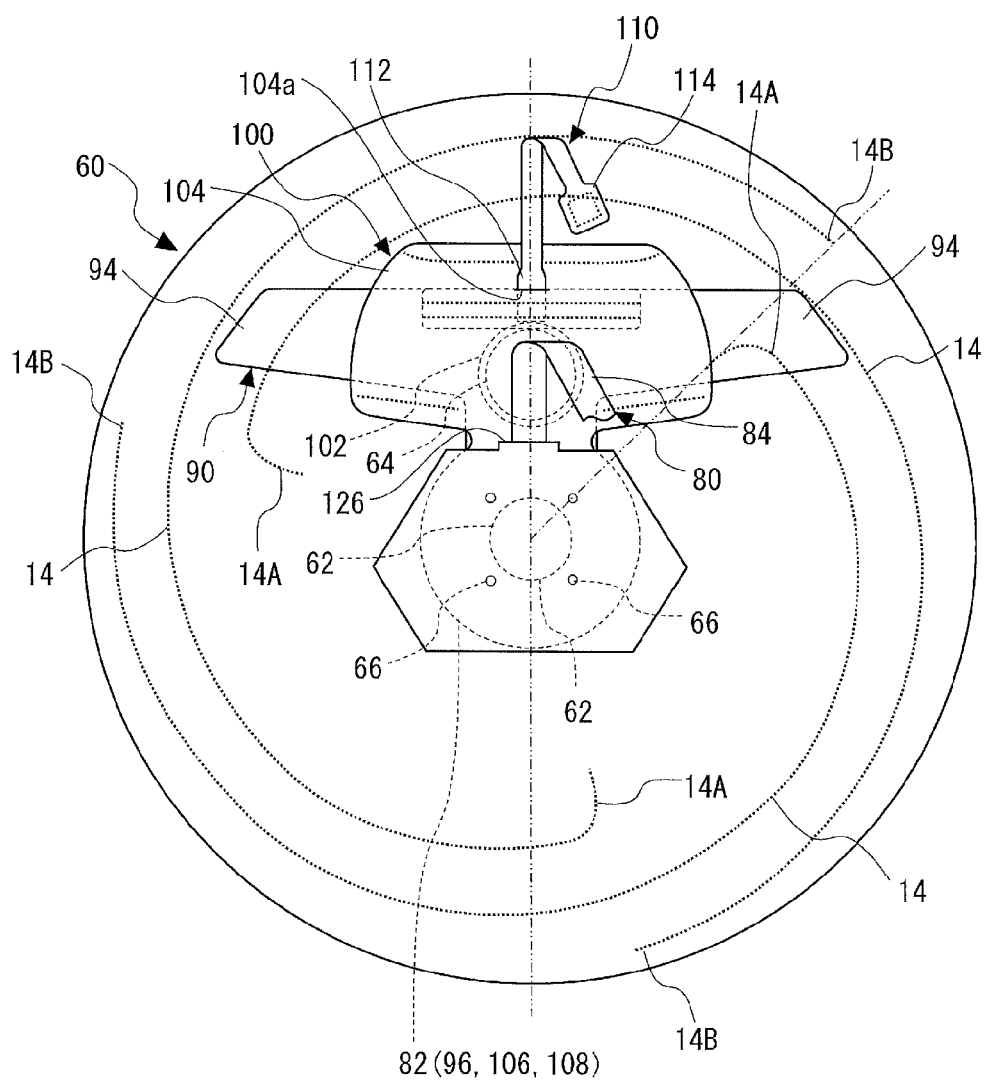
FIG. 11 is a front view of an airbag body of an airbag according to another embodiment, as seen in a state where a front panel of the airbag is detached.

Further, as shown in FIG. 11, the ends of the flaps 94 can be very quickly made as a free end when the one end portion 14A of the tear seam 14 on the innermost periphery is caused to match the ends of the flaps 94.

Meanwhile, the present invention is not limited to the above embodiments, but can be variously modified as follows without departing from the gist of the invention and the scope of the technical idea.

Figure 12:
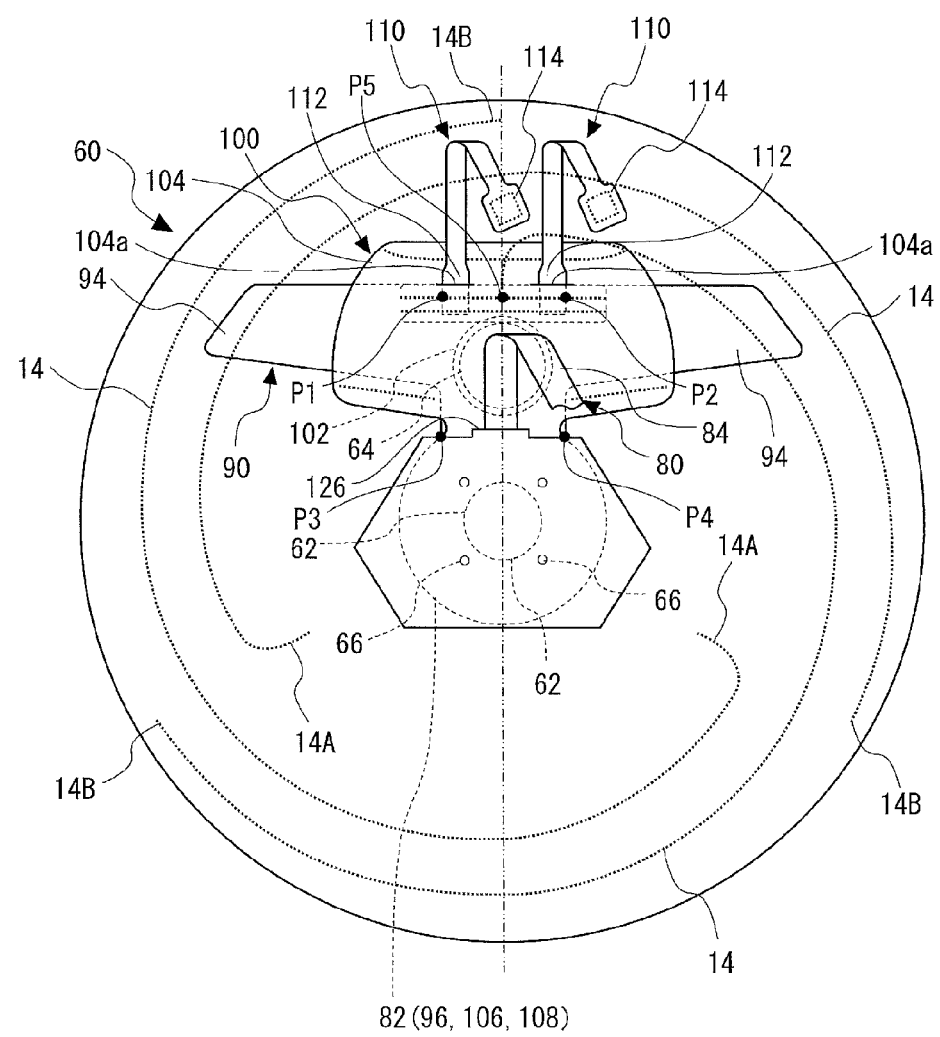
FIG. 12 is a front view of an airbag body of an airbag according to a modified example of the present embodiment, as seen in a state where a front panel of the airbag is detached.

For example, as shown in FIG. 12, the one end portions 112 of two link members 110 may be joined to the other end portion edge of the vent hole cover 90, and the other end portions 114 thereof may be pulled out through the pull-out hole 104a formed in the guide body 104, and then, may be joined to the connecting member 80.

With such a configuration, in the other end portion region of the vent hole cover 90, the vent hole 64 is surrounded with tension-side load points P1, P2 applied to the connecting portion with the one end portions 112 and holding load points P3, P4 in a boundary between the cover body 92 and the ring base fabric 96.

On the contrary, a tension-side load point P5 is located at the center in the width direction of the cover body 92 when one link member 110 described above is used.

Therefore, in the case where the load points P1, P2 are provided at two places in the width direction, it is possible to prevent a portion of the vent hole 64 from being inadvertently opened even when a tension-direction load or a holding-direction load is applied to the cover body 92, as compared to the case where the tension-side load point P5 is provided at one place.

Figure 13:
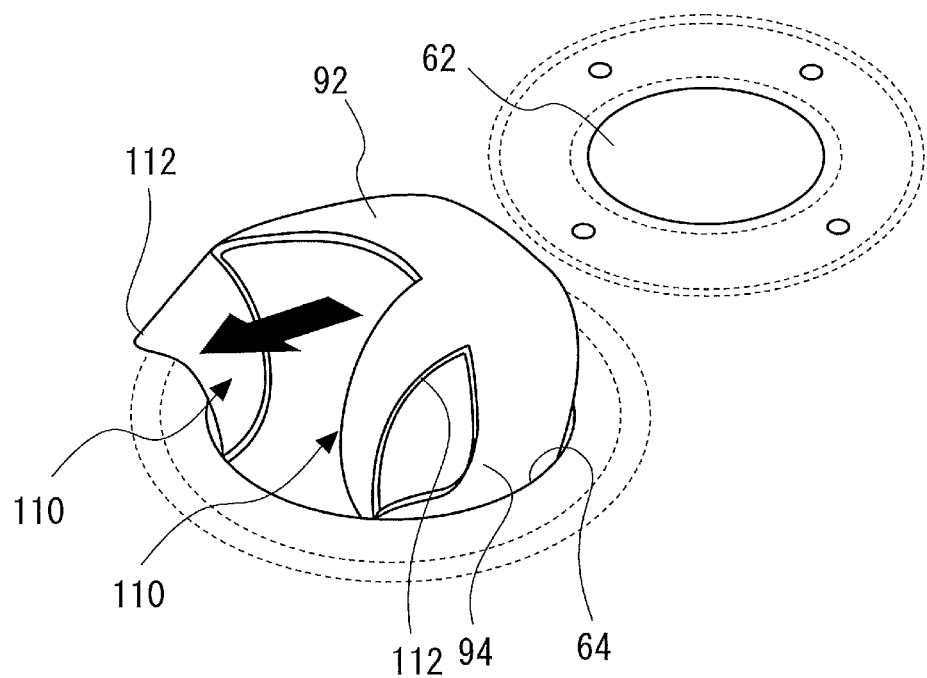
FIG. 13 is a perspective view of a main part of an airbag according to a modified example of the present embodiment in an opening state of a vent hole.

Further, in the case where the one end portions 112 of two link members 110 are joined to the other end portion edge of the vent hole cover 90, the pressurized gas can be discharged between the one end portions when a portion of the one end portions 112 protrudes to the outside of the airbag body 12 from the vent hole 64, as shown in FIG. 13. As a result, the pressurized gas can be more effectively discharged.

Figure 14:
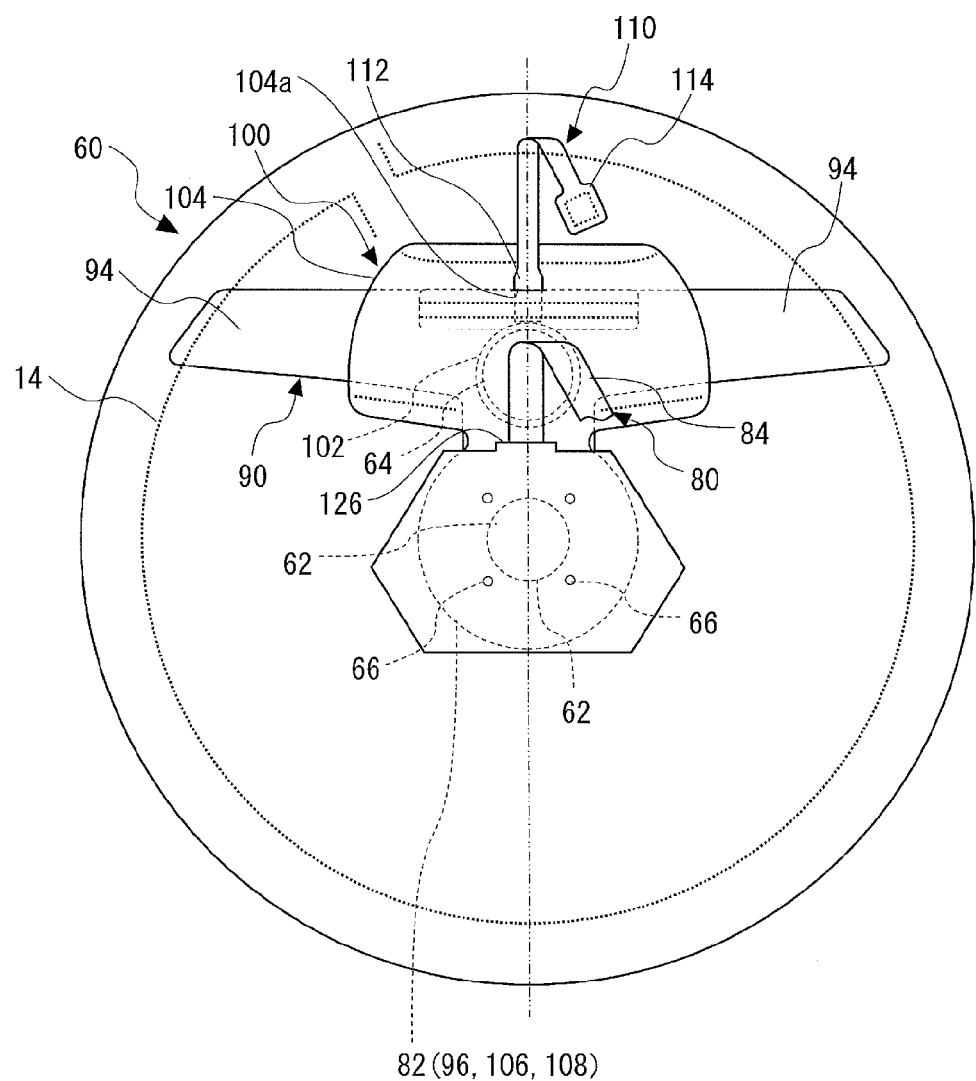
FIG. 14 is a perspective view of a main part of an airbag according to a second modified example of the present embodiment in an opening state of a vent hole.

Furthermore, for example, a single annular coupling portion may be employed as the tear seams 14, as shown in FIG. 14.

Meanwhile, the above-described embodiment is an example of a preferred form of the present invention. However, the present invention is not limited thereto. The above-described embodiment can be variously modified without departing from the scope of the present invention.

What is claimed is:
1. An airbag comprising:
an airbag body that is formed in a bag shape by joining a peripheral edge of a passenger-facing surface facing a passenger in an inflated state and a peripheral edge of a passenger-opposite surface opposite to the passenger-facing surface in the inflated state;

an inlet of pressurized fluid that is formed on the passenger-opposite surface;

a vent hole that is formed on the passenger-opposite surface and that is configured to communicate inside and outside of the airbag body;

a regulation portion that is provided inside of the airbag body and that is configured to regulate discharge of the pressurized fluid from the vent hole; and a coupling portion that is configured to temporarily join the passenger-facing surface and the passenger-opposite surface and that is breakable, wherein the regulation portion comprises:

a connecting member that is configured to regulate a thickness of the airbag body in the inflated state;

a vent hole cover that is configured to cover the vent hole and that has one end portion which is supported by the passenger-opposite surface and an other end portion which is joined to the coupling portion; and a link member that has one end portion which is joined to the vent hole cover and the other end portion which is joined to the connecting member, and wherein the link member is supported by a support portion which is provided on the opposite side of a portion where the vent hole cover is supported by the passenger-opposite surface, with respect to the vent hole.

2. The airbag according to claim 1, wherein the regulation portion further comprises:

a holding member that has one end portion and an other end portion, the one end portion being supported on the passenger-opposite surface, and a portion near the other end portion being positioned so as to cover a part of the other end portion of the vent hole cover, wherein the support portion is provided near the other end portion of the holding member.

3. An airbag apparatus comprising:

the airbag according to claim 1; and an inflator that introduces pressurized fluid into the airbag.

* * * * *